Dec. 29, 1964        H. E. BOWERMAN ETAL        3,163,274
              FLUID ACTUATOR FOR CLUTCH OR BRAKE
                       Filed Dec. 26, 1962
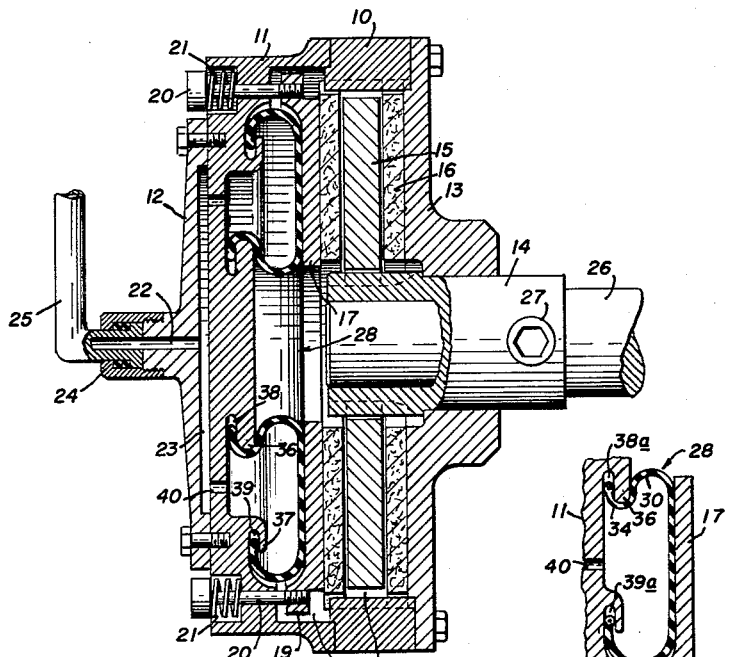
FIG. 1.
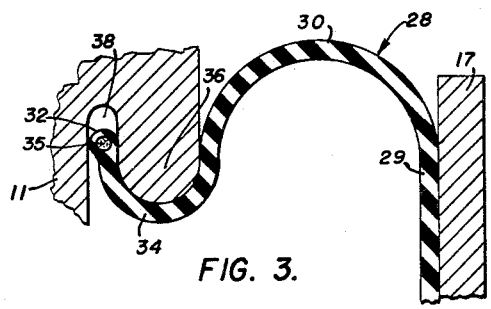
FIG. 4.
FIG. 3.
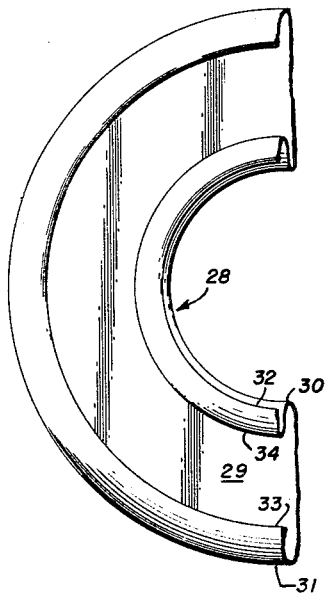
FIG. 2.
HULIE E. BOWERMAN
CHARLES P. WARMAN, JR.
                INVENTORS
BY
                ATTORNEY

** 3,163,274
FLUID ACTUATOR FOR CLUTCH OR BRAKE
Hulie E. Bowerman, P.O. Drawer 152, Arlington, Tex.,
and Charles P. Warman, Jr., Box 1150, Wichita Falls,
Tex.
Filed Dec. 26, 1962, Ser. No. 247,062
3 Claims. (Cl. 192—88)

This invention relates to fluid actuators for clutches, brakes and the like. Particularly, the invention is directed to improvements in diaphragm type fluid actuators such as illustrated and described in U.S. Patent No. 2,940,572, issued June 14, 1960. Particular reference is made to the form of clutch actuator illustrated in FIGURES 1 and 3 of the referred to patent and wherein the actuator is comprised of a flat ring surface having inner and outer convex walls therearound and projecting rims or beads around the borders of the wall. The entire actuator of the patent is of flexible material except for bead wires embedded in both inner and outer beads, and which wires are necessary for rigidity. The beads are received in an annular recess and bear against the opposite walls thereof. The annular recess receiving the beads is in a solid circular body, for example, the fly wheel of a clutch, and the flat surface is positioned to bear against a pressure plate when the actuator is inflated. However, in practice, when the actuator was inflated the inner bead wire was placed in compression with the result that the inner bead did not effect as good a seal as the outer bead, the wire of which was placed in tension. Moreover, because the inner wire bead was in compression, there was a tendency of the inner bead to become loose and bend.

Accordingly, the object of the present invention is to provide a fluid actuator assembly of the described class wherein both inner and outer beads are placed in tension when the actuator is inflated, thereby effecting a better seal and at the same time providing improved means for securing the beads in place.

In the accompanying drawing:

FIGURE 1 is a vertical sectional view of a disc type clutch or brake illustrating the present improved actuator assembly as a part thereof.

FIGURE 2 is a fragmentary elevational view of the actuator.

FIGURE 3 is an enlarged vertical sectional view of the inner bead and inner wall of the actuator.

FIGURE 4 is a sectional view similar to FIGURE 1 and showing a modified form of the invention.

The device illustrated in FIGURE 1 represents either a clutch or a brake depending on its use and the details of which will vary in accordance with requirements. Primarily, the device shown is comprised of a housing ring 10, a circular body 11 connected with one of the plane surfaces of the housing ring, a circular cover 12 secured to the outer face of the body, a housing cover 13 secured to the outer face of the housing ring, a splined hub 14 journalled in the axial center of the housing cover, a disc drive plate 15 splined on the hub, friction plates 16 on both sides of the drive plate and having their peripheries splined to the inner surface of the housing ring, and a movably mounted pressure plate 17 within a cavity 18 in the inner face of the body. The pressure plate 17 has a flange 19 therearound for receiving the threaded ends of pressure plate bolts 20 which are slidably mounted in the body 11. The outer face of the body 11 is counterbored about the axis of each bolt 20 to receive helical pressure springs 21. The body cover 12 has an axial port 22 extending therethrough to a circular cavity 23 in the inner face of the cover, and the outer end of the port is provided with a turning seal 24 for connection with a fluid pressure supply line 25. The splined hub 14 receives a drive or, as the case may be, a driven shaft 26 which is secured against turning in the hub by a set screw 27.

The actuator 28 which includes the novel features of the present invention is of resilient material such as rubber or neoprene and may be reinforced with fabric laminates, not shown, in the manner of pneumatic tires. The actuator 28 is in the form of a ring and has a flat surface 29 for contact with the face of the pressure plate 17. Around the inner and outer circumferences of the flat surface 29 there are inner and outer convex walls 30 and 31, the extending portions of which have inwardly directed flanged beads 32 and 33, both of which are substantially parallel with the flat surface 29. The inner flanged bead 32 is connected with its wall 30 by a reverse bend 34 as particularly shown in FIGURE 3. Each flanged bead 32 and 33 has a circular bead wire 35 embedded therein.

Within the body cavity 18 and facing the pressure plate 17 there are inner and outer outwardly directed flanges 36 and 37 integral with the body 11, the recesses 38 and 39 inwardly of the flanges being of substantially smaller inside diameters than the peripheries of the flanged beads 32 and 33 they receive. Arcuate surfaces, not numbered, are provided in both the body 11 and the pressure plate 17 to accommodate expansion of the outer actuator wall 31. It is to be noted in FIGURE 1 that inner flange 36 is inwardly recessed along the axial line relative to the outer flange 37 so as to provide a relatively large radius for contact with the actuator's reverse bend 34. However, the flange recesses may be in the same plane as shown at 38a and 39a in FIGURE 4. In both forms of the invention the outer surface of the flanged bead 39 or 39a makes sealing contact with the body 11, the sealing effect of which is increased as the actuator 28 is inflated.

The deep flange recesses 38 and 39 provide easy and convenient installation of the actuator beads 32 and 33, and when installed the inner flange 36 maintains the concentric position of the actuator 28. In operation the actuator 28 is inflated and deflated through the supply line 25, the port 22 in the body cover 12, the cavity 23 therein, and ports 40 in the body 11 communicating with the interior of the actuator. When the actuator 28 is inflated both inner and outer beads 32 and 33, and the bead wires 35 therein, are in tension, thus effecting better seals with the surfaces they contact.

The invention is not limited to the exemplary constructions herein shown and described, but may be made in various ways within the scope of the appended claims.

What is claimed is:

1. In a device for applying and relieving torque forces wherein said device includes a body having an inner circular portion and a pressure plate spaced therefrom, said pressure plate being mounted for parallel movement relative to said circular portion.

inner and other outwardly directed flanges on said circular portion, both said flanges being concentric about the center of said body.

a diaphragm type actuator between said body and said pressure plate, said actuator being of flexible material in the form of a ring and having inner and outer walls therearound, and inwardly directed flanged beads around said walls on the perimeters thereof opposite said pressure plate, said beads being of a size to engage said flange on said body.

2. In a device for applying and relieving torque forces as defined in claim 1, the construction wherein:
  the inner diameters of the recess adjacent said flange are substantially less than the inner peripheries of said beads.
3. In a device for applying and relieving torque forces as defined in claim 1, the construction including:
  a reverse bend in said actuator as viewed in transverse cross section between said inner wall and said inner bead, and
  an arcuate surface around the outer periphery of said inner flange conforming with the arc of said reverse bend.

References Cited by the Examiner

UNITED STATES PATENTS 2,588,724 3/52 Hobbs.
2,682,892 7/54 Picard.

FOREIGN PATENTS 539,168 4/57 Canada.

OTHER REFERENCES

Wichtendahl, German printed application 1,051,081, 2/59.

DAVID J. WILLIAMOWSKY, *Primary Examiner.*

UNITED STATES PATENT OFFICE
CERTIFICATE OF CORRECTION

Patent No. 3,163,274 December 29, 1964

Hulie E. Bowerman et al.

It is hereby certified that error appears in the above numbered patent requiring correction and that the said Letters Patent should read as corrected below.

Column 2, line 59, for "other" read -- outer --.

Signed and sealed this 4th day of May 1965.

(SEAL)
Attest:

ERNEST W. SWIDER
Attesting Officer

EDWARD J. BRENNER
Commissioner of Patents